(12) United States Patent
Luo et al.

(10) Patent No.: US 8,321,552 B2
(45) Date of Patent: Nov. 27, 2012

(54) METHOD AND DEVICE FOR CREATING MANAGEMENT OBJECT INSTANCE IN MANAGEMENT TREE OF TERMINAL DEVICE

(75) Inventors: Yaoping Luo, Shenzhen (CN); Rui Wang, Shenzhen (CN); Yue Song, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 142 days.

(21) Appl. No.: 12/773,409

(22) Filed: May 4, 2010

(65) Prior Publication Data

US 2010/0216449 A1 Aug. 26, 2010

Related U.S. Application Data

(63) Continuation of application No. PCT/CN2008/071576, filed on Jul. 8, 2008.

(30) Foreign Application Priority Data

Nov. 15, 2007 (CN) .......................... 2007 1 0187278

(51) Int. Cl.
*G06F 15/16* (2006.01)
(52) U.S. Cl. ......... 709/223; 709/224; 709/225; 709/226
(58) Field of Classification Search ........... 709/223–226
See application file for complete search history.

(56) References Cited

U.S. PATENT DOCUMENTS

| | | | |
|---|---|---|---|
| 7,269,602 B2 * | 9/2007 | Kaappa ................................ | 1/1 |
| 7,604,162 B2 * | 10/2009 | Li et al. .......................... | 235/376 |
| 7,974,613 B1 * | 7/2011 | Shanker et al. ................ | 455/419 |
| 7,991,878 B2 * | 8/2011 | Li et al. .......................... | 709/224 |
| 8,095,674 B2 * | 1/2012 | Ye et al. ......................... | 709/229 |
| 8,117,293 B1 * | 2/2012 | Anderson ...................... | 709/223 |
| 8,209,676 B2 * | 6/2012 | Kapadekar et al. ........... | 717/171 |
| 2003/0103484 A1 * | 6/2003 | Oommen et al. ............. | 370/338 |

(Continued)

FOREIGN PATENT DOCUMENTS

CN 1645819 A 7/2005

(Continued)

OTHER PUBLICATIONS

Written Opinion of the International Search Authority issued in corresponding PCT Application No. PCT/CN2008/071498, mailed Sep. 11, 2008. 4 pages.

(Continued)

*Primary Examiner* — Kevin Bates
*Assistant Examiner* — Marcus McKenzie
(74) *Attorney, Agent, or Firm* — Brinks Hofer Gilson & Lione

(57) ABSTRACT

The present disclosure relates to a method and a device for creating an MO instance in the management tree of a terminal device. The method for creating the MO instance in the management tree of the terminal device comprises adding the node value to an unnamed node or a specified node of the unnamed node in the MO of the management tree in the terminal device, obtaining data information relative to the content of the unnamed node or the specified node of the unnamed node, generating the name of the unnamed node according to the data information, and adding the MO instance into the management tree of the terminal device. The present disclosure accordingly provides a communications device.

4 Claims, 10 Drawing Sheets

U.S. PATENT DOCUMENTS

| | | | |
|---|---|---|---|
| 2004/0123241 A1* | 6/2004 | Kaappa et al. | 715/513 |
| 2005/0010552 A1* | 1/2005 | Kaappa et al. | 707/1 |
| 2005/0022129 A1* | 1/2005 | Borenstein et al. | 715/734 |
| 2006/0069743 A1* | 3/2006 | Oommen | 709/217 |
| 2006/0117099 A1* | 6/2006 | Mogul | 709/223 |
| 2006/0212558 A1* | 9/2006 | Sahinoja et al. | 709/223 |
| 2006/0236325 A1* | 10/2006 | Rao et al. | 719/315 |
| 2007/0093243 A1* | 4/2007 | Kapadekar et al. | 455/419 |
| 2007/0106770 A1* | 5/2007 | Alnas | 709/223 |
| 2007/0158404 A1* | 7/2007 | Li et al. | 235/375 |
| 2007/0294385 A1* | 12/2007 | Kapadekar et al. | 709/223 |
| 2008/0043726 A1* | 2/2008 | Herrero-Veron et al. | 370/352 |
| 2008/0114570 A1* | 5/2008 | Li et al. | 702/186 |
| 2008/0288630 A1* | 11/2008 | Merat et al. | 709/224 |
| 2009/0019141 A1* | 1/2009 | Bush et al. | 709/223 |
| 2009/0040947 A1* | 2/2009 | Krivopaltsev | 370/255 |
| 2009/0044185 A1* | 2/2009 | Krivopaltsev | 717/173 |
| 2009/0089658 A1* | 4/2009 | Chiu et al. | 715/234 |
| 2009/0094363 A1* | 4/2009 | He et al. | 709/224 |
| 2009/0111467 A1* | 4/2009 | Chai et al. | 455/435.1 |
| 2010/0110935 A1* | 5/2010 | Tamassia et al. | 370/256 |
| 2010/0138537 A1* | 6/2010 | Ye et al. | 709/225 |
| 2010/0199333 A1* | 8/2010 | Keum et al. | 726/4 |
| 2010/0216449 A1* | 8/2010 | Luo et al. | 455/418 |
| 2010/0268743 A1* | 10/2010 | Hallyal et al. | 707/797 |
| 2010/0299418 A1* | 11/2010 | Bhat | 709/221 |
| 2011/0009110 A1* | 1/2011 | Liu et al. | 455/418 |
| 2011/0040829 A1* | 2/2011 | Lee et al. | 709/203 |
| 2011/0231537 A1* | 9/2011 | Song et al. | 709/223 |
| 2011/0231538 A1* | 9/2011 | He et al. | 709/223 |
| 2011/0238806 A1* | 9/2011 | Bhat et al. | 709/223 |
| 2011/0314462 A1* | 12/2011 | Clark et al. | 717/169 |
| 2012/0023227 A1* | 1/2012 | Song et al. | 709/224 |
| 2012/0144456 A1* | 6/2012 | Anderson | 726/4 |

FOREIGN PATENT DOCUMENTS

| | | |
|---|---|---|
| CN | 1972202 A | 5/2007 |
| EP | 1 513 317 A2 | 3/2005 |
| EP | 1 513 317 A3 | 6/2006 |
| EP | 1 686 469 A2 | 8/2006 |
| EP | 1 686 469 A3 | 1/2009 |
| WO | WO 2004/046963 A1 | 6/2004 |
| WO | 2005/004395 A1 | 1/2005 |

OTHER PUBLICATIONS

Extended European Search Report Issued in corresponding European Patent Application No. 08773130.3, mailed Sep. 15, 2010. 7 pages.

Open Mobile Alliance Ltd., *OMA Push Management Object*, OMA-TS-Push_MO-V1_1-20100316-C. Candidate Version 1.1, Mar. 16, 2010. 20 pages.

Open Mobile Alliance Ltd., *Mobile E-Mail Management Object (MEM MO)*, OMA-TS-Mobile_Email_MO-V1_0. Version 1, Aug. 18, 2009. 8 pages.

Open Mobile Alliance Ltd., *Software Component Management Object*, OMA-TS-DM-SCOMO-V1_0-2008060416-D. Draft Version 1.0, Apr. 16, 2008. 42 pages.

Open Mobile Alliance, Ltd., *OMA Device Management Bootstrap*, OMA-TS-DM_Bootstrap-V1_2-20070209-A. Approved Version 1.2, Feb. 9, 2007. 28 pages.

Open Mobile Alliance Ltd., *OMA Device Management Standardized Objects*, OMA-TS-DM_StdObj-V1_2-20060919-C. Candidate Version 1.2, Sep. 19, 2006. 45 pages.

Forum Nokia, OMA Device Management DDF for Nokia Remote Customization. Version 1.0, Feb. 1, 2006. 37 pages.

International Search Report issued in corresponding PCT Application No. PCT/CN2008/071576; mailed Oct. 23, 2008.

* cited by examiner

METHOD AND DEVICE FOR CREATING MANAGEMENT OBJECT INSTANCE IN MANAGEMENT TREE OF TERMINAL DEVICE

CROSS-REFERENCE TO RELATED APPLICATIONS

This application is a continuation of international application number PCT/CN2008/071576 filed on Jul. 8, 2008, which claims priority to Chinese Patent Application No. 200710187278.4, filed on Nov. 15, 2007, both of which are hereby incorporated by reference in their entireties.

FIELD OF THE DISCLOSURE

The present disclosure relates to the communications field, and in particular, to a method and a device for creating a management object (MO) instance in a management tree of a terminal device.

BACKGROUND

The Open Mobile Alliance Device Management (OMA DM) Work Group has developed the standard specifications for device management. As defined in the specifications, the third party (for example, mobile carrier, service provider, or information management department from a partner) uses a device management (DM) server to manage and set the environment and configuration information of terminal devices such as mobile phones and functional objects in terminal devices on a radio network. This helps solve various problems in operating the network devices. The DM server and terminal devices can be integrated to form a DM system in which the DM server manages and configures the terminal devices in the over the air (OTA) manner, such as installation and upgrading of software and firmware. This helps deliver customized services and improve user experience.

As shown in FIG. 1, in the DM system, a DM agent in a terminal device parses and runs management commands sent by the DM server. A DM management tree stored in a terminal device can be regarded as an interface through which the DM server manages the terminal device based on a DM protocol. The DM management tree includes basic management objects (MOs). To control the MO of the terminal device, the DM server sends operating commands to operate the MO of the DM management tree. The operating commands include "Get", "Replace", "Exec (execute)", "Copy", "Delete", and so on.

The DM management tree of the terminal device also includes unnamed nodes which serve as placeholders. After being instantiated by the DM server or terminal device, the unnamed nodes are named. These nodes are called x nodes.

As shown in FIG. 2, the DM protocol has defined a standard DevInfo (device information) MO for storing basic information about the terminal device in the DM management tree. For example, "DevId" denotes a device identification (ID), "Man" denotes a manufacturer, "Ext" denotes extension, and "Bearer" denotes a bearer network, where the Ext and Bearer respectively includes an unnamed node x and an unnamed node y referred to as x nodes. When the terminal device is in operation, nodes x and y may be instantiated and named. For example, node y may be named "CDMA". In FIG. 2, the symbol "*" indicates that the node can be used many times or, alternatively, is not used at all. Additionally, the symbol may include "+" to indicate that the node can be used one e or many times. Therefore, node y can be instantiated multiple times. For example, node y can be instantiated and named "GSM" after being named CDMA, and then Bearer has two nodes, namely, CDMA and GSM.

As shown in FIG. 3, in the instantiated DevInfo MO, the x node is instantiated to three nodes with different names, namely, "VendorSpecial1", "VendorSpecial2", and "VendorSpecial3".

The x nodes may fall into two types: internal node or leaf node. The internal node indicates that the node has sub-nodes, and the leaf node indicates that the node cannot have a sub-node. For example, the x node in the Push MO in FIG. 4 is an internal node. The x node in FIG. 2 is a leaf node. Additionally, nodes in the management tree can also fall into two types: permanent node or dynamic node. The permanent node indicates that the node is created before the terminal device leaves the factory and cannot be deleted. The dynamic node indicates that the node can be created and deleted when the terminal device is in service. The x nodes are dynamic nodes.

Additionally, according to the DM protocol, both named nodes and x nodes include their own Framework property, which is defined by the device description framework (DDF). As a file used by equipment vendors for describing the structure of the management tree inside the terminal device, the DDF includes information about relation between nodes, node property, and so on. The Framework property of a node includes AccessType, DefaultValue, Occurrence, and so on to identify the features of a node.

In implementing the present disclosure, the inventor has identified problems with regards to the conventional art. The conventional art does not specify rules for naming the x nodes when the MO instance is being created in the management tree of the terminal device. One reason may be that when the x node is being created by the server, this node may be named by meaningless characters, such as pure numbers. Therefore, another server may fail to obtain the node content when querying this node. As shown in FIG. 4, for example, when querying the TrustedSMSC node, the server can obtain the quantity and names of instances of its sub-node. If the instances are named by meaningless characters, however, the server will fail to obtain the meaning of the instances and the content of the downstream of the instances. Only after the server has queried the sub-nodes can it define this node (for example, the server can infer the content of this node according to its sub-nodes). This causes multiple interactions between the terminal device and the server, high seizure ratio of resources, and long processing duration.

SUMMARY

A method and a device for creating management object (MO) instances in a management tree of a terminal device are provided in the embodiments. After creating MO instances in a management tree of a terminal device, the node content can be obtained through the node name when the node is queried.

A method for creating an MO instance in a management tree of a terminal device is provided in an embodiment. This method includes adding a node value to an unnamed node or a specified node under the unnamed node in the MO of the management tree in the terminal device, obtaining data information relative to the content of the unnamed node or the specified node under the unnamed node, generating the name of the unnamed node according to the data information, and adding an instance for the MO of the management tree into the management tree of the terminal device.

A communications device is provided in an embodiment. This device includes a node value adding module adapted to add a node value to an unnamed node or a specified node under the unnamed node in an MO of the management tree in a terminal device, an obtaining module adapted to obtain data information relative to the content of the unnamed node or the specified node under the unnamed node, a generating module adapted to generate the name of the unnamed node according to the data information, and an instantiating module adapted to add an MO instance into the management tree of the terminal device according to the name of the unnamed node and the node value added into the specified node in the MO of the management tree in the terminal device.

In the embodiments, the node value is added to a specified node under the unnamed node in the MO of the management tree in the terminal device and data information is acquired. The data information is relative to the content of the unnamed node in the MO instance of the management tree in the terminal device. According to the acquired data information, the name of the unnamed node is generated, and the MO instance is added into the management tree of the terminal device. Therefore, when this node is subsequently queried, its meaning and content can be obtained through the node's name. In the conventional art, a server needs to query sub-nodes of a node to obtain the meaning and content of the node when the node in the MO instance of the management tree in the terminal device is unnamed or named by meaningless characters. The present disclosure reduces the query times, for example, interactions between the server and the terminal device, and saves air interface resources and reduces the processing duration. Moreover, the present disclosure provides a standard naming manner and presentation approach for the unnamed node in the MO of the management tree in the terminal device.

DETAILED DESCRIPTION OF THE EMBODIMENTS

The embodiments of the present disclosure are detailed with reference to accompanying drawings.

Figure 1:
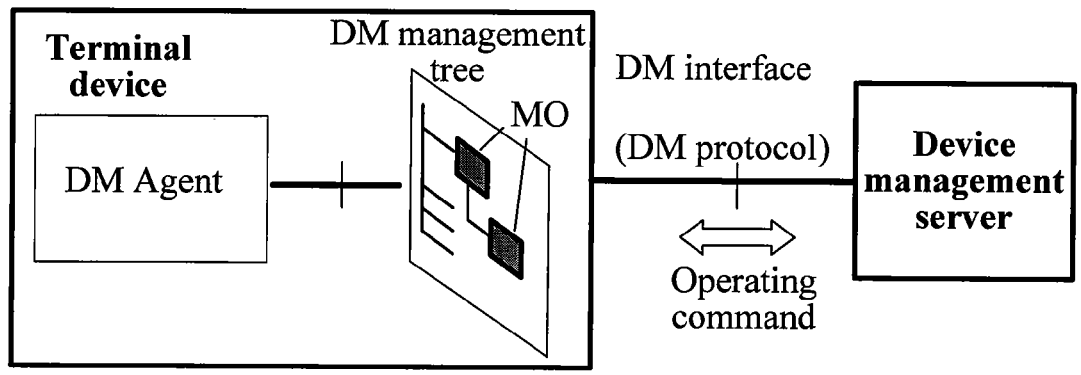
FIG. 1 shows a structure of a DM system in the conventional art.
Figure 2:
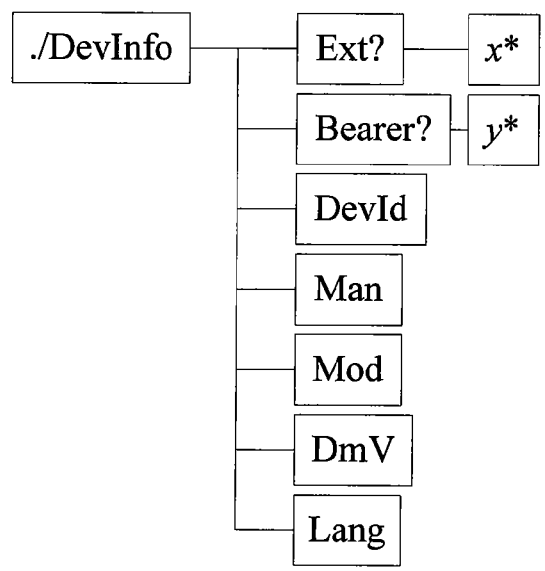
FIG. 2 shows a structure of a device information MO in the conventional art.
Figure 3:
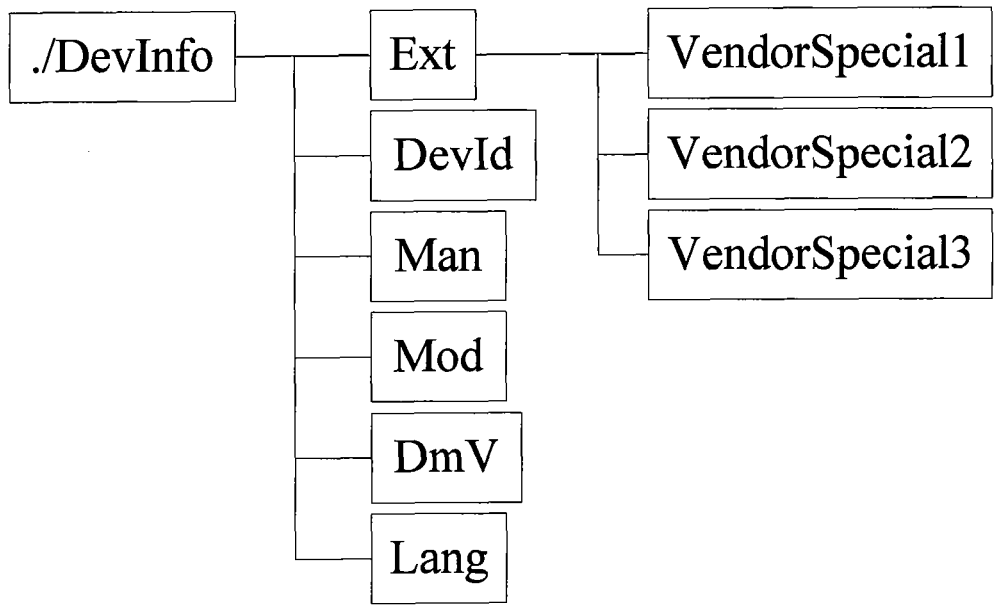
FIG. 3 shows a structure of an instantiated device information MO in the conventional art.
Figure 4:
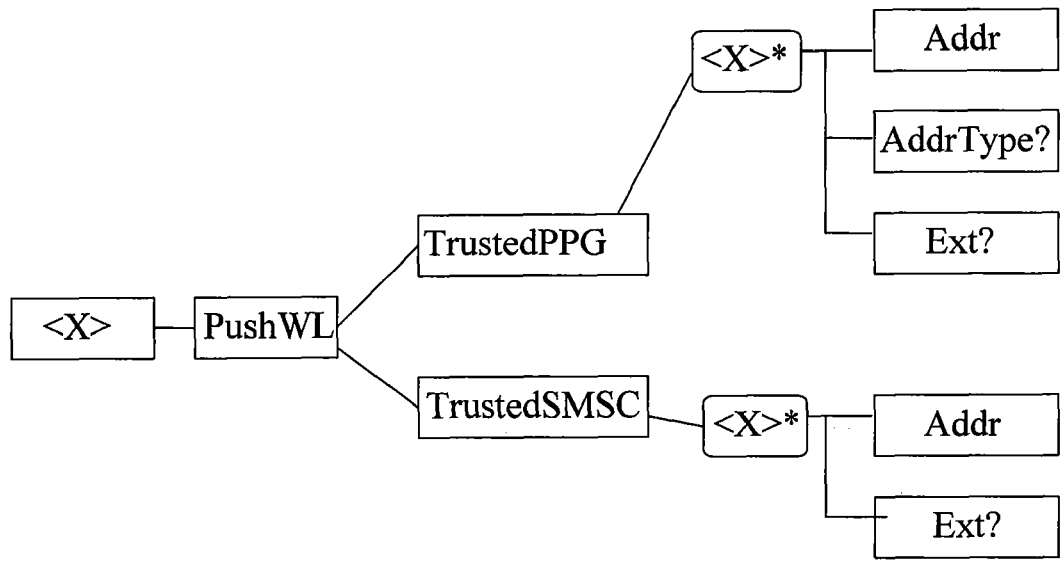
FIG. 4 shows a structure of a Push MO in the conventional art.
Figure 5:
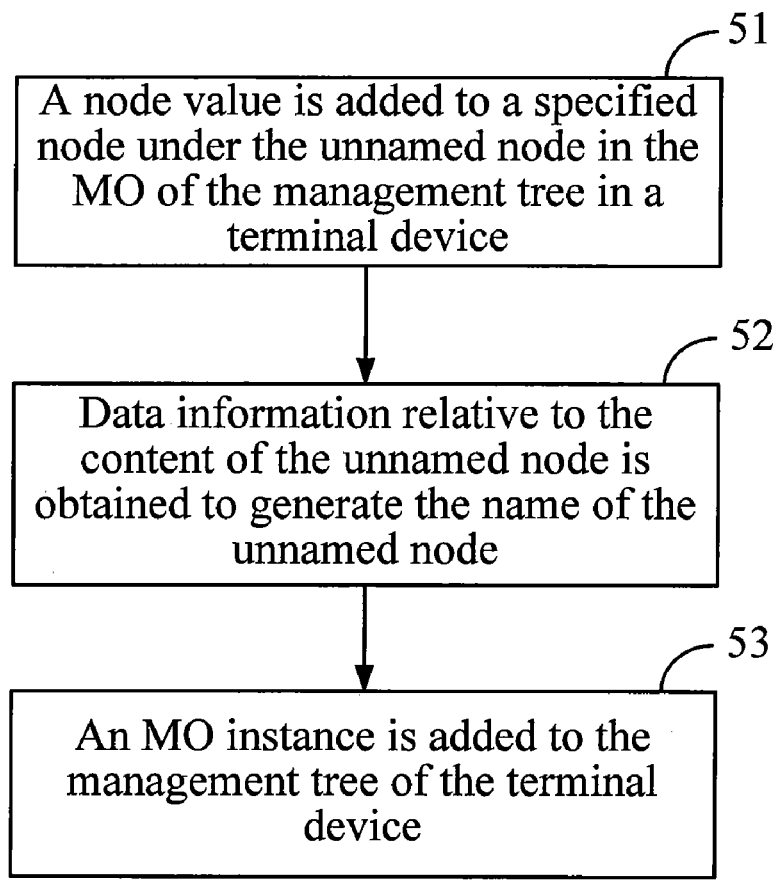
FIG. 5 shows a flowchart for creating an MO instance in a management tree of a terminal device in an embodiment.

As shown in FIG. 5, the process for creating a management object (MO) instance in a management tree of a terminal device provided in the embodiment of the present disclosure includes the following steps:

Step 51: A node value is added into a specified node under an unnamed node in the MO of the management tree in the terminal device. The specified node includes sub-nodes of the unnamed node or nodes from other MOs.

Step 52: Data information relative to the content of the unnamed node (i.e., data information is relative to the node value) is obtained to generate the name of the unnamed node. The data information may be preset or provided by users or carriers.

Step 53: An MO instance is added to the management tree of the terminal device.

When subsequently querying the node s, data information can be obtained from the name of the node to determine the content of this node.

As shown in FIG. 5, when creating the MO instance in the management tree of the terminal device, the server or the terminal device generates the name of the node. Data information can be preset according to default naming rules. For example, data information may be the preset name of the specified node under the unnamed node (x node) where the specified node is a node specified in advance to name the x node. This node may be a sub-node of the x node or a node from any other MO. When the name of the unnamed node is generated according to the data information, the node value of the specified node under the unnamed node can be set as the name of the unnamed node. In actual implementation, through the device description framework (DDF) definition, namely, when defining the MO of the management tree in the terminal device, a new property, Naming, is added to the x node based on the DDF. An example is shown below:

```
<MgmtTree>
    <VerDTD>1.2</VerDTD>
    <Man>--The device manufacturer--</Man>
    <Mod>--The device model--</Mod>
    <Node>
        <NodeName/>
        <DFProperties>
            <AccessType/>
            <DFFormat>
                <node/>
            </DFFormat>
            <Occurrence>
                <OneOrMore/>
            </Occurrence>
            <DFTitle>--The Interior node--</DFTitle>
            <Naming>ServerID</Naming>
        </DFProperties>
            <Node>
                <NodeName>AppID</NodeName>
                ......
            </Node>
            <Node>
                <NodeName>ServerID</NodeName>
                ......
            </Node>
            ......
    </Node>
</MgmtTree>
```

The preceding example shows the DDF (in which other nodes are omitted) of a DMAcc (device management account) MO, where <NodeName/> denotes the unnamed x node with two sub-nodes AppID and ServerID listed below. As seen from this example, default naming rules are provided in the Naming property of the x node, namely, the specified node under the x node is named ServerID.

The default naming rules can also be implemented by setting the following list of default naming rules in the device. This list defines the default naming rules for the x node, as shown below:

TABLE 1

List of default naming rules

| No. | Name of Parent Node | Name of Specified Node |
|---|---|---|
| 1 | Download | PkgID |
| 2 | AppAuth | AAuthType |
| 3 | EmbeddedLinks | $SoftwareID |

As shown in the preceding table, the second column shows the names of parent nodes of the x node, and the third column shows the names of specified nodes of the x node. In the first two rows, the names of the specified nodes are names of sub-nodes of the x node. In the third row, the names of the specified nodes are variable names of any other nodes. Therefore, data information may reflect mapping between the name of the parent node of the unnamed node and the name of the specified node. In this regard, when the name of the unnamed node is generated according to the data information, the name of the specified node under the unnamed node can be determined according to the name of the parent node of the unnamed node and the mapping, and the node value of the specified node is set as the name of the unnamed node.

Figure 6:
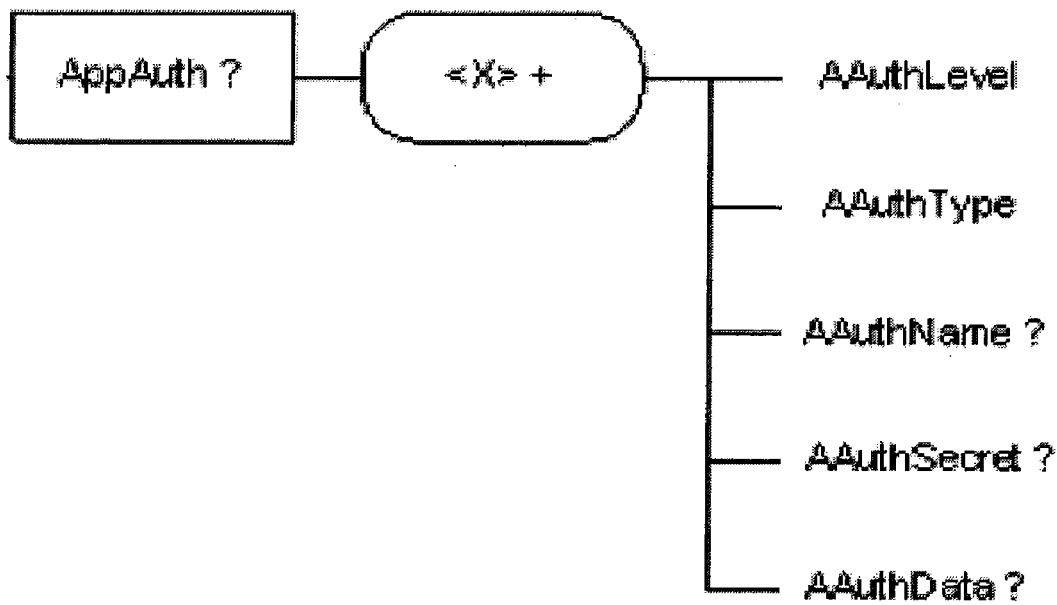
FIG. 6 shows a partial structure of a DM Account MO in an embodiment.

FIG. 6 shows part of the DMAcc MO which stores authentication information of the terminal device. The x node therein can be named before the server performs instantiation.

As shown in the list of default naming rules in Table 1, the specified node under the x node is named AAuthType, with the specified node value set to HMAC. Therefore, the x node is named HMAC.

Then, the server can send the management command to the terminal device to create the instance in the terminal device. After receiving the command, the terminal device adds this instance into the terminal device's management tree. Thus, to query whether the AppAuth node includes the HMAC instance, any other server may simply run the Get command on the AppAuth node to traverse returned names of sub-nodes. If the instances are named by meaningless symbols, the server runs the Get command on the AAuthType node in each instance for query.

When the node value is set as the name of the unnamed node, if this node value contains special symbols, the node value is replaced with preset characters. For example, if the node value is not of character or integer type, or if the node value contains special symbols like "/", preset characters can be used to replace the node value. If the length of the node value exceeds the threshold, part of the characters in the node value can be truncated and set as the name of the unnamed node.

As shown in FIG. 5, before the unnamed node is named, whether the unnamed node is a leaf node can be determined first. If the unnamed node is determined to be a leaf node, the data information can be the node value of the unnamed node (i.e., the node value of the leaf node is the node value added by the system to the unnamed node in the MO of the management tree in the terminal device), and the node value of the unnamed node can be set as the name of the unnamed node when the name of the unnamed node is generated according to the data information. The data information is relative to the node value of the unnamed node. Another possible method may include naming the unnamed node according to the above-mentioned default naming rules. If the unnamed node is not provided with suitable default naming rules, the method of determining whether the unnamed node is a leaf node is applied.

Figure 7:
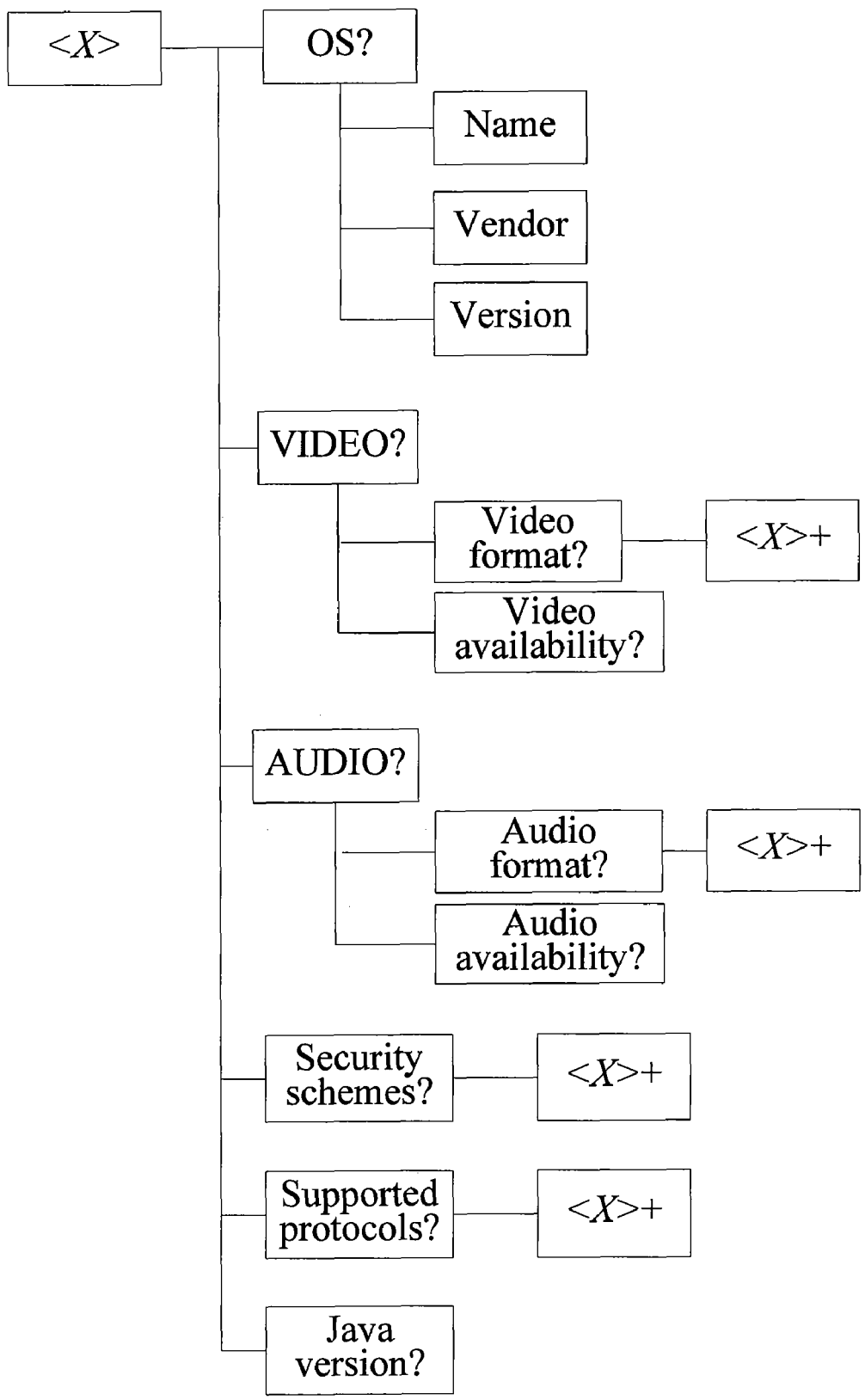
FIG. 7 shows a partial structure of a Security schemes MO in an embodiment.

As shown in FIG. 7, the server names the x node therein before creating a Security schemes MO in the terminal device. As shown in the list of default naming rules in Table 1, no default naming rules are provided for such a node. The x node is a leaf node. Assuming that the x node's value is MD5, the x node is named MD5.

After the server names all the x nodes, the server sends a management command for adding this MO. When receiving this command, the terminal device adds the MO to the terminal device's management tree. Thus, to query whether this MO contains MD5, any other server may run the Get command on the Security schemes node to traverse returned names of sub-nodes. If sub-nodes are randomly named by meaningless symbols, the server needs to run the Get command on every sub-node to obtain the sub-nodes' values for query.

If the unnamed node is determined to be an internal node instead of a leaf node, the quantity of sub-nodes contained in this unnamed node can be obtained. If the unnamed node contains only one sub-node, the data information can be the node value of the sub-node. When the name of the unnamed node is generated according to the data information, the node value of this sub-node is set as the name of the unnamed node.

Figure 8:
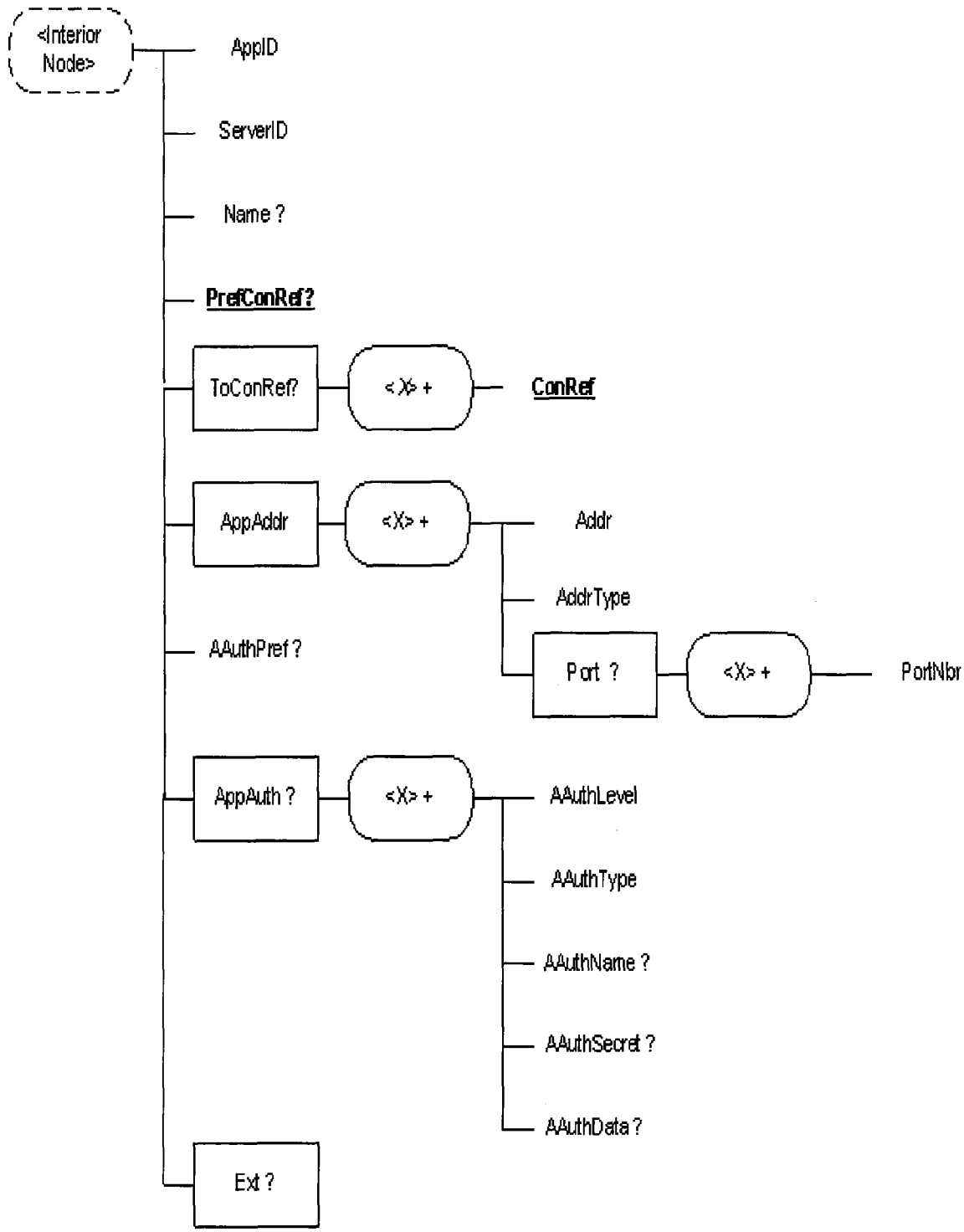
FIG. 8 shows a partial structure of a DM Account MO in an embodiment.

As shown in FIG. 8, the ToConRef node in the DMAcc MO contains one x node. If the node contains only one sub-node and no default naming rule is specified for such a node, the node value of this sub-node is used to name the x node. Assuming that the node value contains the symbol/, the x node can be named ConRef-1. If new instances are added to the ToConRef node, they can be named ConRef-2, ConRef-3, etc.

Then, the server sends a management command to add the MO instance. After receiving the command, the terminal device adds this MO instance into the terminal device's own management tree.

If the unnamed node is determined to be an internal node and contains multiple sub-nodes, the data information can be node values of the multiple sub-nodes. In generating the name of the unnamed node according to the data information, the names of all sub-nodes under the unnamed node are matched with the keywords preset in the keyword list. If only one sub-node is successfully matched, the node value of this sub-node is set as the name of the unnamed node. If multiple sub-nodes are successfully matched, one of these sub-nodes is selected and the node value of the selected sub-node is set as the name of the unnamed node.

In matching, whether the names of all sub-nodes under the unnamed node can be matched with the keywords preset in the keyword list is determined. If such is the case, matching succeeds. Otherwise, whether the names of the sub-nodes under the unnamed node contain characters of the keywords preset in the keyword list needs to be determined and matching succeeds if such is the case.

The keyword list saved in the device corresponds to the node names. The list can be extended with the increasing node types. For example, a list may be {ID, Name, Addr}.

If multiple sub-nodes are successfully matched, one of these sub-nodes can be selected and the node value of the selected sub-node is set as the name of the unnamed node according to the priority level of the sub-nodes that match the keywords. The priority level can be determined according to the sequence of the sub-nodes that match the keywords, whether corresponding node values are available, types of the corresponding node values, the length of the corresponding node values, or any combination thereof.

Figure 9:
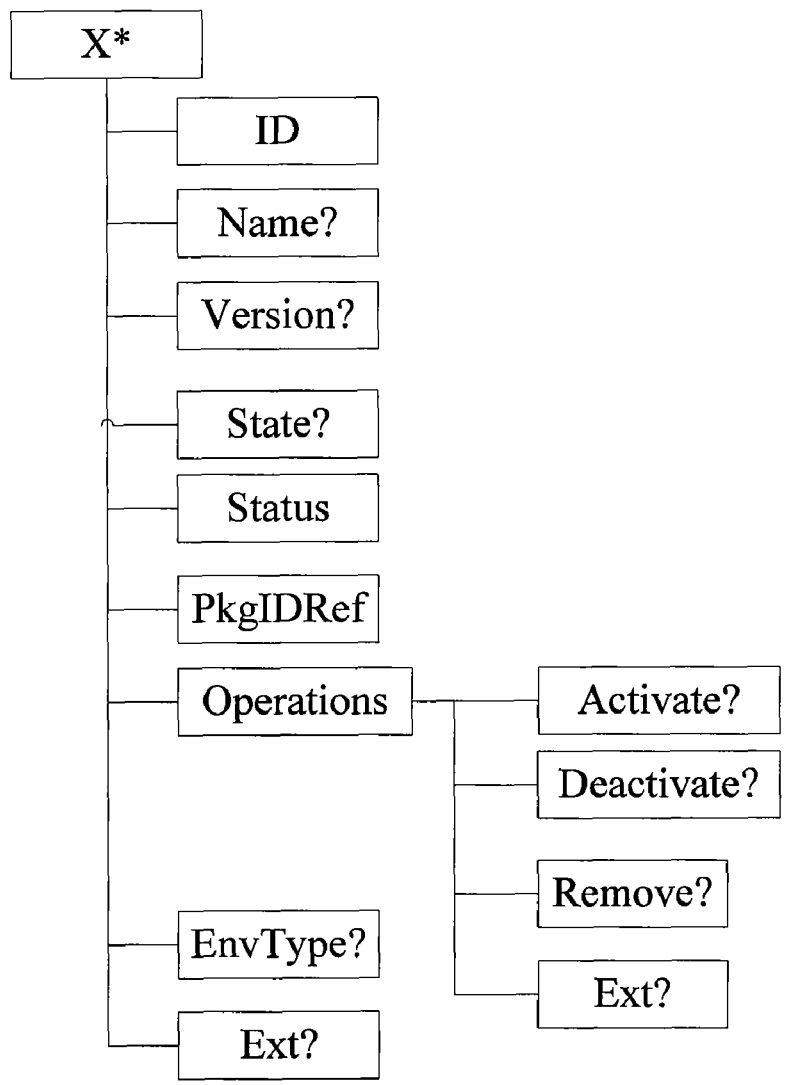
FIG. 9 shows a partial structure of a software module MO in an embodiment.

As shown in FIG. 9, the x node in the software module MO contains a sub-node ID and a sub-node Name, which are set in the list of default naming rules. Such an x node is not provided with default naming rules and is an internal node. Therefore, the names of its sub-nodes are matched with the keywords in the keyword list (for example, {ID, Name, Addr}). Two sub-nodes, namely, ID and Name, are successfully matched, and sub-node ID is selected according to the sequence of the keywords. Assuming that the node value of sub-node ID is set to Office, the x node is named Office.

Then, the server sends a management command to add the MO instance. After receiving the command, the terminal device adds the MO instance into the terminal device's own management tree.

As shown in FIG. 8, information of the DMAcc MO needs to be configured before the terminal device leaves the factory, and then the terminal device can communicate with the server. The configuration process is called bootstrap for which two methods are available, namely, CP Profile (client supply) and DM Profile (DM supply). When performing bootstrap through the CP Profile, the server sends a CP packet. Then, the terminal device creates a DMAcc MO instance according to the content of this packet and meanwhile the terminal device names the unnamed node.

For example, the root node in FIG. 8 is an x node. Assuming that its Naming property is ServerID, the node value of the ServerID node is used to name the x node. Assuming that the node value of the ServerID node is ServerDM, this x node is named ServerDM.

When the names of all sub-nodes contained in the unnamed node are matched with the keywords preset in the keyword list, if matching fails, the node value of any sub-node can be set as the name of the unnamed node.

In an embodiment of the present disclosure, when the node value of a sub-node is set as the name of an unnamed node, if the sub-node has no corresponding node value, the name of this sub-node is set as the name of the unnamed node. When the name of a node is set as the name of an unnamed node, if the node name contains special symbols, the node name can be replaced with preset characters. For example, if the node name is not of character or integer type, or if the node name contains special symbols like "/", preset characters can be used to replace the node value. If the length of the node name exceeds the threshold, part of the characters in the node name can be truncated and set as the name of the unnamed node.

The naming method provided in the embodiments of the present disclosure is used to name the x node in the management tree of the terminal device in the following two scenarios.

Scenario I: The x node is named when the server is creating an MO instance in the management tree of the terminal device.

This scenario refers to that in which the x node is named before the server creates the MO instance in the terminal device, and then the MO instance is sent to the terminal device though a management command.

The process of this scenario includes the following steps:

Step A: The server adds node values into all the specified nodes that need node values in the MO instance to be created. The node value can be preset on the server, provided by users through websites for the server, or provided by carriers for the server.

Step B: The server searches for the x nodes in the MO instance to be created and names all the searched x nodes based on the following steps where the list of default naming rules as shown in Table 1 is taken as an example here:

step a: The server queries the x nodes to check whether the default naming rules are available. If the default naming rules are available, the node value of the corresponding specified node is set as the name of the x node (see FIG. 6) where the name of the specified node may be a variable that has been assigned a value before this step. For example, SoftwareID in Table 1 has been assigned a value before this step. Assuming that SoftwareID's value is MediaPlayer and the symbol $ is used for obtaining the value of the variable, $SoftwareID is MediaPlayer. When the specified node contains the symbol $ in the specified node's name, this name can be directly used to name the x node. After the x node is named, the process proceeds to Step C. If the default naming rules are not available, the process proceeds to step b.

step b: The server judges whether the x node is a leaf node. If such is the case, the value of the x node is set as the x node's name (see FIG. 7), and after the x node is named, the process proceeds to Step C. If the x node is not a leaf node, the process proceeds to step c.

step c: The server judges whether the x node contains only one sub-node. If such is the case, the node value of the sub-node is set as the name of the x node (see FIG. 8), and after the x node is named, the process proceeds to Step C. Otherwise, the process proceeds to step d.

step d: The server queries the name of each sub-node in this x node and searches for names that are matched with the keywords in the list of node name keywords (for example, {ID, Name, Addr}). In matching, whether all the sub-node names match any name in the keyword list needs to be checked. If such is the case, recording is performed and matching is complete. If no sub-node names matches any name in the keyword list, whether names of sub-nodes contain characters of the keywords in the keyword list needs to be re-checked, and if such is the case, recording is performed and matching is complete. If matching succeeds, the server selects one sub-node from the matching records and uses the node value of the selected sub-node to name the x node. Such selection may be performed in light of the priority level of the sub-nodes that match the keywords, for example, the sequence (see FIG. 9), or performed in light of whether the sub-nodes that match the keywords have corresponding node values, types of corresponding node values, the length of the corresponding node values, or any combination thereof. After the x node is named, the process proceeds to Step C. If matching totally fails, the process proceeds to step e.

step e: The server randomly selects a sub-node and names the x node based on the node value of the sub-node. If the selected sub-node has no node value, the node value is null, the node value contains special symbols, or the length of the node value exceeds the threshold, the server selects another sub-node that has the suitable node value and names the x node based on the node value of this sub-node.

In steps c, d, and e, if a sub-node has no node value (i.e., this sub-node is an internal node or the sub-node's node value is null) the name of the sub-node is used to name the x node. If the node value is not of character or integer type or if the node value contains special symbols like "/", preset characters can be used to replace the node value. If the length of the node value exceeds the threshold, part of characters in the node value or the node name can be truncated and set as the name of the unnamed node.

Step C: The server sends a DM message for creating an MO instance to the terminal device. The x node carried in this message has been named according to the foregoing steps.

Step D: Upon receiving the message from the server, the terminal device creates this MO instance in the management tree.

After the preceding steps, the server has named the x node.

Scenario II: The x node is named when the terminal device is creating an MO instance.

The MO instance can be created not only by the server but also by the terminal device itself. The MO instance can be created when the terminal device is processing the packet sent by the server, when the terminal device is connecting with a new hardware, or based on the requests from users.

For example, when bootstrap is performed for the terminal device through the CP Profile, the server sends a CP packet. Then, the terminal device creates an MO instance and names the unnamed node in the MO instance if such an unnamed node exists.

For another example, when users are adding the URL into the Favorite folder of a specified application in the terminal device, the terminal device creates an MO instance for saving the URL at a specified place in the management tree. For example, the URL may be added at:./Customization/EmbeddedLinks/IE/Links/<x>.

The process of this scenario includes the following steps:

Step A: The terminal device adds node values to all the specified nodes that need a node value in the MO instance to be created. The node value may be obtained from the packet or entered by users.

Step B: The terminal device searches the x nodes in the MO instance to be created and names all the searched x nodes based on the following steps:

step a: The terminal device queries the x node to check whether the default naming rules are available. If such is the case, the node value of the corresponding specified node is set as the name of the x node where the name of the specified node may be a variable that has been assigned a value before this step. For example, SoftwareID in Table 1 has been assigned a value before this step. Assuming that its value is MediaPlayer and the symbol $ is used for obtaining the value of the variable, $SoftwareID is MediaPlayer. When the name of the specified node contains a symbol $, the name of the specified node can be used to name the x node directly. After the x node is named, the process proceeds to Step C. If no default naming rules are available, the process proceeds to step b.

step b: The terminal device judges whether the x node is a leaf node. If such is the case, the value of the x node is set as the x node's name, and after the x node is named, the process proceeds to Step C. Otherwise, the process proceeds to step c.

step c: The terminal device judges whether the x node contains only one sub-node. If such is the case, the node value of the sub-node is set as the name of the x node, and after the x node is named, the process proceeds to Step C. Otherwise, the process proceeds to step d.

step d: The terminal device queries the name of each sub-node in this x node and searches for names that match the keywords in the list of node name keywords (for example, {ID, Name, Addr}). In matching, whether all the sub-node names match any name in the keyword list needs to be checked. If such is the case, recording is performed and matching is complete. If no sub-node names matches any name in the keyword list, whether the names of sub-nodes contain characters of the keywords in the keyword list needs to be re-checked, and if such is the case, recording is performed and matching is complete. If matching succeeds, the terminal device selects one sub-node from the matching records and uses the node value of the selected sub-node to name the x node. Such selection may be performed in light of the priority level of the sub-nodes that match the keywords, for example, the sequence, or performed in light of whether the sub-nodes that match the keywords have corresponding node values, types of the corresponding node values, length of the corresponding node values, or any combination thereof. After the x node is named, the process proceeds to Step C. If matching totally fails, the process proceeds to step e.

step e: The terminal device randomly selects a sub-node and names the x node based on the node value of the sub-node. If the selected sub-node has no node value, the node value is null, the node value contains special symbols, or the length of the node value exceeds the threshold, the terminal device selects another sub-node that has a suitable node value to name the x node based on the node value of this sub-node.

In steps c, d, and e, if a sub-node has no node value (i.e., this sub-node is an internal node or its node value is null), the node name of the sub-node is used to name the x node. If the node value is not of character or integer type or if the node value contains special symbols like "/", preset characters can be used to replace the node value. If the length of the node value exceeds the threshold, part of the characters in the node value or the node name can be truncated and set as the name of the unnamed node.

Step C: The terminal device creates this MO instance in the management tree.

After the preceding steps, the terminal device has named the x node.

Figure 10:
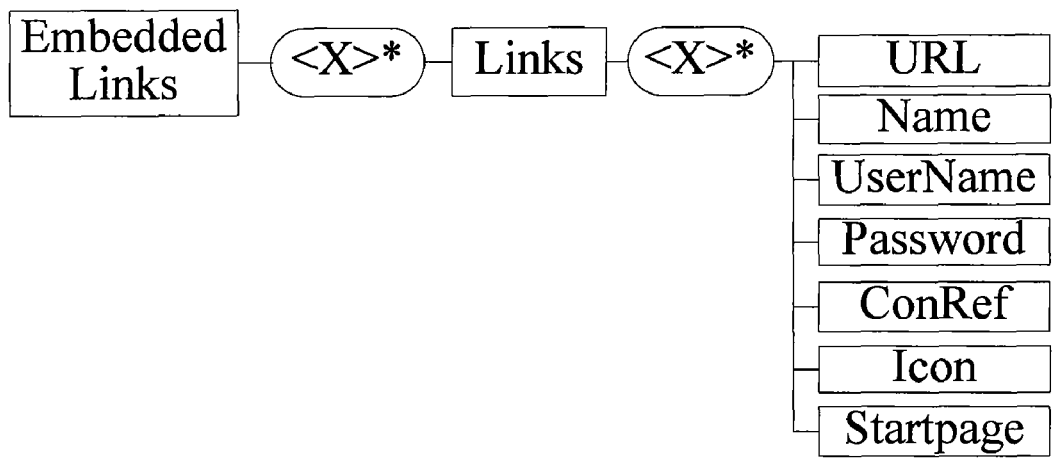
FIG. 10 shows a partial structure of a remote customization MO in an embodiment.

As shown in FIG. 10, the EmbeddedLinks node of the remote customization MO is a sub-node of the Customization node in the terminal device and contains information about the Favorite folders of various applications in the terminal device. In EmbeddedLinks/<x>, x is used for identifying the applications, such as MediaPlayer and Internet Explorer (IE). In Links/<x>, x is used for identifying the collected links in the applications.

Assuming that a user(s) desires to add a link to the MediaPlayer application, the user(s) need to provide information about the link, such as URL, Name, and/or UserName, to the terminal device. For x in EmbeddedLinks/<x>, it is named $SoftwareID according to the default naming rules (see Table 1). As MediaPlayer is already assigned for $SoftwareID at this time, when the terminal device is naming the x node in the MO, the x node is named MediaPlayer.

For the x node in Links/<x>, no default naming rules are provided in the list of default naming rules (see Table 1). Therefore, the names of all its sub-nodes are matched with the keyword list, and one matching result can be obtained, namely, Name (according to the matching method, UserName fails to be matched successfully at this time). Assuming that the value of the Name node is www.mp3.com, the terminal device names this x node www.mp3.com.

Optionally, assuming that the value of the Name node is "www.thelongestdomain-nameintheworldandthensomean-dthensomemoreandmore.com", which exceeds the specified length (e.g., 30) of the MaxSegLen parameter in the Devdetail MO, the node value of the Name node can be truncated at this time and the x node can be named "thelongestdomainname".

For the x node in Links/<x>, if matching fails, any sub-node can be selected for naming. For example, if the UserName sub-node is selected and the UserName sub-node's node value is Michael, the x node is named Michael.

In an embodiment, in naming the unnamed node, the identifier of the server or the terminal device that creates the MO instance in the management tree of the terminal device can be added into the name of the node. This helps identify whether the MO is created by the server or by the terminal device itself. The MO as shown in FIG. 10 is further taken as an example below.

If the MO instance is created by the server, the x node in EmbeddedLinks/<x> can be named ServerA-MediaPlayer, and the x node in Links/<x> can be named ServerA-www.mp3.com, where the ServerA denotes the ID of the server that creates this MO.

If the MO instance is created by the terminal device, the x node in EmbeddedLinks/<x> can be named IMEI1234-MediaPlayer, and the x node in Links/<x> can be named IMEI1234-www.mp3.com, where the 1234 denotes the last four digits of the IMEI of the terminal device that creates this MO.

Figure 11A:
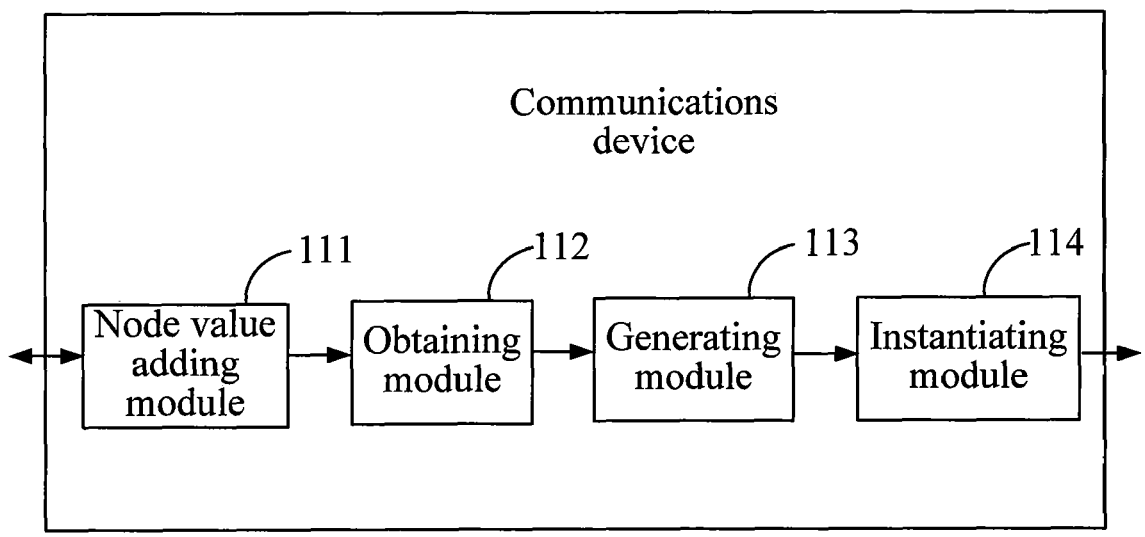
FIG. 11A, FIG. 11B, FIG. 11C, and FIG. 12 show a structure of a communications device in the embodiments.
Figure 11:
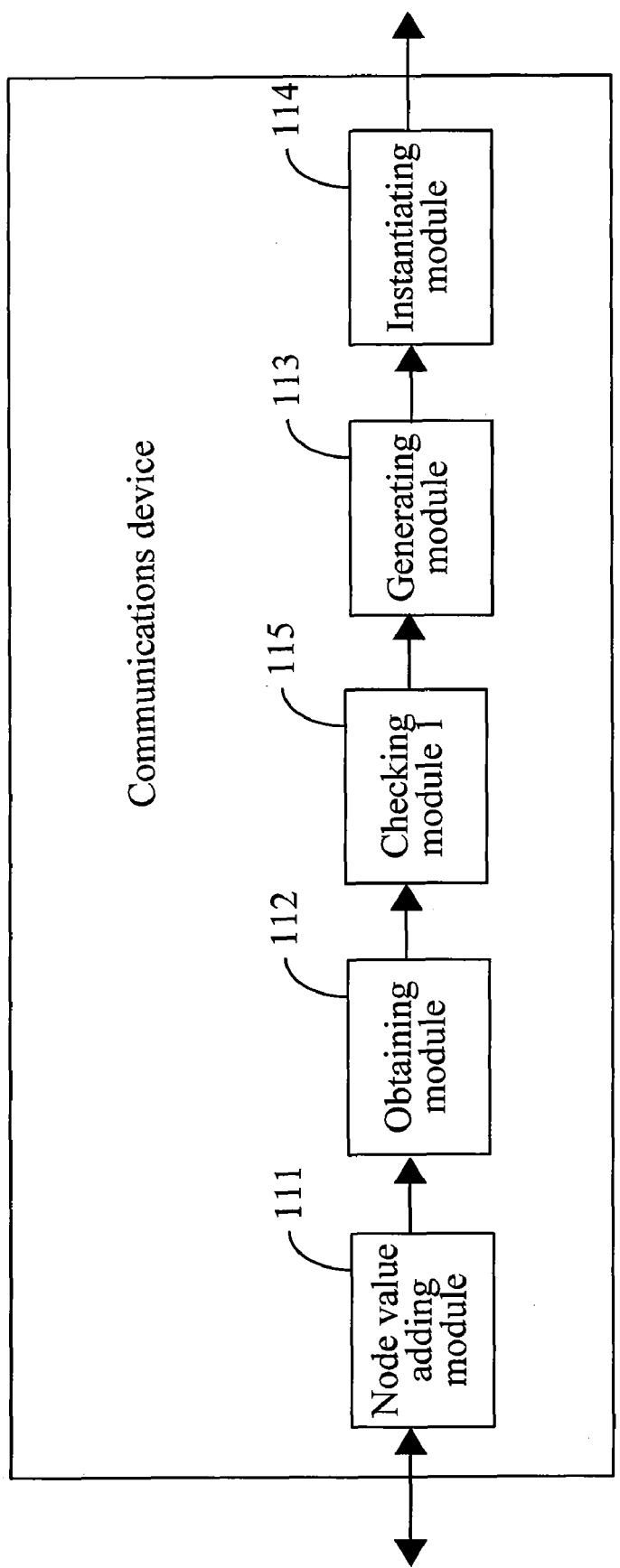
FIG. 11D shows a structure of a generating module in an embodiment.

Based on the same concept, a communications device is further provided in the embodiments of the present disclosure with its structure as shown in FIG. 11A. The communications device comprises a node value adding module 111, an obtaining module 112, a generating module 113, and an instantiating module 114.

The node value adding module 111 is adapted to add the node value to the unnamed node or the specified node under the unnamed node in the MO of management tree in the terminal device where the specified node is a sub-node under the unnamed node or a node from any other MO.

The obtaining module 112 is adapted to obtain data information relative to the node value of the unnamed node or the specified node under the unnamed node.

The generating module 113 is adapted to generate the name of the unnamed node according to the obtained data information.

The instantiating module 114 is adapted to add the MO instance into the management tree of the terminal according to the name of the unnamed node and the added node value of the specified node in the MO of the management tree in the terminal device.

In an embodiment, the obtaining module 112 is further adapted to obtain data information that is preset or provided by users or carriers.

In an embodiment, data information can be the name of the specified node of the unnamed node. The generating module 113 is further adapted to set the node value of the specified node under the unnamed node as the name of the unnamed node.

Optionally, data information can reflect mapping between the name of the parent node of the unnamed node and the name of the specified node. The generating module 113 is further adapted to determine the name of the specified node under the unnamed node according to the name of the parent node of the unnamed node and the mapping and set the node value of the specified node as the name of the unnamed node.

As shown in FIG. 11B, in an embodiment, the communications device as shown in FIG. 11A further includes a first determining module 115 adapted to determine whether the unnamed node is a leaf node. If such is the case, the data information can be the node value of the unnamed node. The generating module 113 is further adapted to set the node value of the unnamed node as the name of the unnamed node.

Figure 11C:
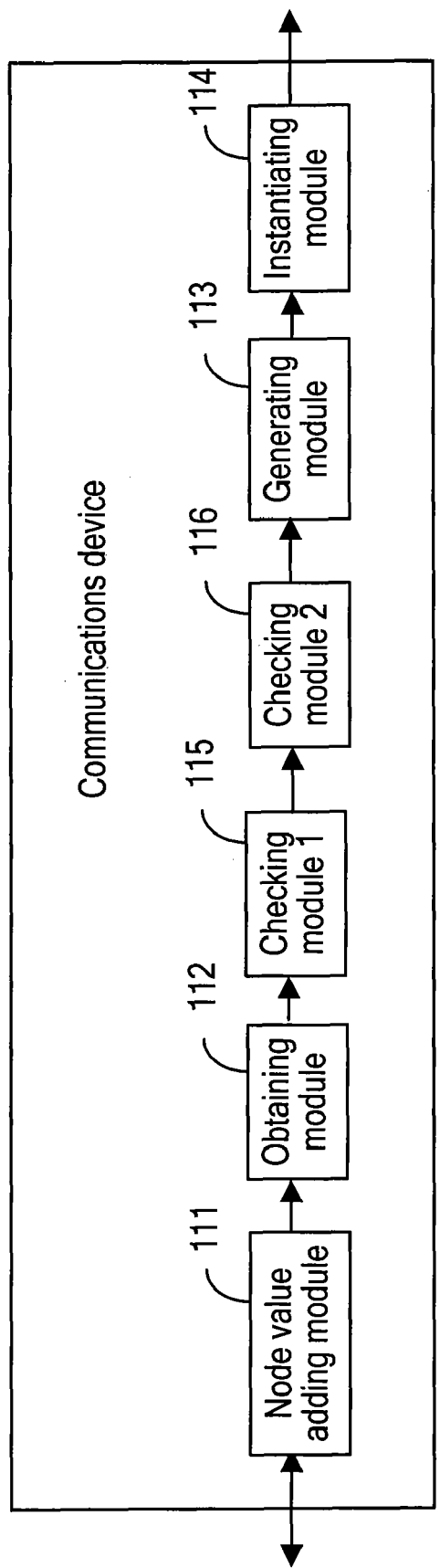

As shown in FIG. 11C, in an embodiment, the communications device as shown in FIG. 11B further includes a second determining module 116 adapted to determine the quantity of sub-nodes contained in the unnamed node when the unnamed node is determined to be an internal node. If the unnamed node contains only one sub-node, the data information can be the node value of the sub-node. The generating module 113 is further adapted to set the node value of the sub-node as the name of the unnamed node.

Figure 11D:
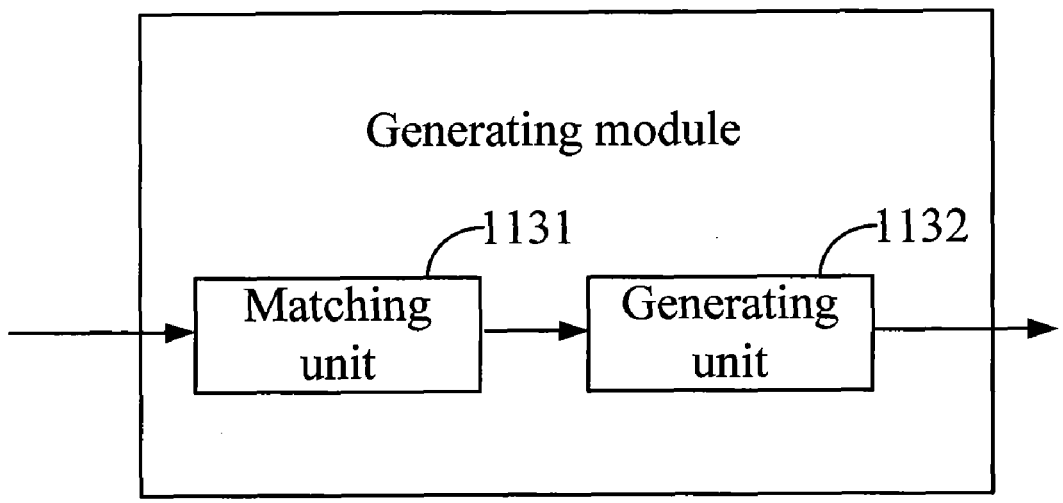

In an embodiment, if the unnamed node is determined to contain multiple sub-nodes, the data information can be the node values of the multiple sub-nodes. As shown in FIG. 11D, the generating module 113 includes a matching unit 1131 and a generating unit 1132.

The matching unit 1131 is adapted to match the names of all the sub-nodes under the unnamed node with the keywords preset in the keyword list.

The generating unit 1132 is adapted to set the node value of this sub-node as the name of the unnamed node if only one sub-node is successfully matched and select one sub-node from the multiple sub-nodes and set its node value as the name of the unnamed node if multiple sub-nodes are successfully matched.

In an embodiment, the matching unit 1131 is further adapted to determine whether the names of all the sub-nodes under the unnamed node match the keywords preset in the keyword list. If such is the case, matching is successful. If no sub-node under the unnamed node match the keywords, the matching unit 1131 is adapted to check whether the names of the sub-nodes under the unnamed node contain characters of the keywords preset in the keyword list. if such is the case, matching is successful.

In an embodiment, the generating unit 1132 is further adapted to select one sub-node from the multiple sub-nodes that are successfully matched and set the node value of the selected sub-node as the name of the unnamed node according to the priority level of the sub-nodes that are successfully matched. The generating unit 1132 is further adapted to determine the priority level of the sub-nodes that match the keywords according to the sequence of the sub-nodes that match the keywords, whether the corresponding node values are available, types of the corresponding node values, the length of the corresponding node values, or any combination thereof.

In an embodiment, the generating unit 1132 is further adapted to randomly select a sub-node and set the node value of the selected sub-node as the name of the unnamed if matching fails.

The generating module 113 is further adapted to, when setting the node value of a sub-node as the name of an unnamed node, set the name of the sub-node as the name of the unnamed node if the sub-node has no corresponding node value.

The generating module 113 is further adapted to, when the node value is set as the name of an unnamed node, replace the node value with the preset characters if the node value contains special symbols.

As shown in FIG. 11A, FIG. 11B, and FIG. 11C, the communications device can be a terminal device or a server. The generating module 113 is further adapted to generate the name of the unnamed node when the MO instance is being created in the management tree of the terminal device.

The generating module 113 is further adapted to, when generating the name of the unnamed node, add into the name of the unnamed node the identifier of the server or terminal device that creates the MO instance in the management tree of the terminal device.

Figure 12:
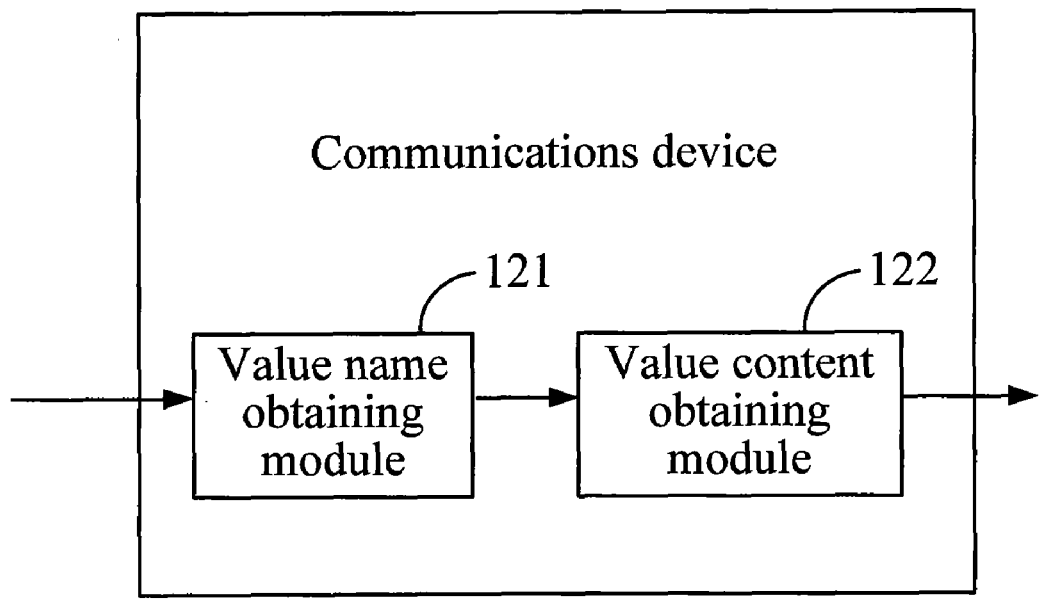

Based on the same concept, a communications device is also provided in the embodiments of the present disclosure with the communications device's structure shown in FIG. 12. The communications device comprises a node name obtaining module 121 and a node content obtaining module 122.

The node name obtaining module 121 is adapted to send an obtaining command and obtain the name of the named node in the MO instance of the management tree in the terminal device where the name of the named node is the name of the unnamed node generated according to obtained data information, and the data information is relative to the content of the unnamed node.

The node content obtaining module 122 is adapted to obtain the content of the named node according to the name of the named node.

In an embodiment, the name of the named node can be the node value of a specified node under the named node, the node value of the named node, or the name of the sub-node under the named node.

It is understandable for those skilled in the art that all or some steps in the forgoing embodiments may be performed through hardware instructed by programs. The programs can be saved in a readable storage medium, for example, a read-only memory (ROM), a random-access memory (RAM), a disk, or an optical disk.

In the embodiments of the present disclosure, data information, relative to the content of the unnamed node in the MO instance of the management tree in the terminal device, is obtained to generate the name of the unnamed node. Therefore, to query this node in the subsequent operations, the meaning and content of this node can be obtained through its name. In the conventional art, when a node is unnamed or named by meaningless characters, a server needs to query its sub-nodes to obtain the meaning and content of the node. The present disclosure reduces the query times, for example, interactions between the server and the terminal device, saves air interface resources, and reduces the processing duration. Moreover, the present disclosure provides a standard naming manner and presentation approach for the unnamed node in the MO of the management tree in the terminal device.

It is clear that those skilled in the art can make various changes and modifications to the present disclosure without departing from the scope of the present disclosure.

What is claimed is:

1. A method for creating a management object (MO) instance in a management tree of a terminal device, comprising:

adding a node value to a specified node under an unnamed node in an MO of the management tree in the terminal device;

setting the node value of the specified node under the unnamed node as the name of the unnamed node; and adding the MO instance in the management tree of the terminal device.

2. The method according to claim 1, wherein:

when the node value is set as the name of the unnamed node, if the node value contains special symbols, the node value is replaced with preset characters.

3. A communications device, comprising one or more processors, memory; and one or more programs, wherein the one or more programs are stored in the memory and configured to be executed by the one or more processors, the one or more programs including:

instructions for adding a node value to a specified node under an unnamed node in an MO of the management tree in the terminal device;

instructions for setting the node value of the specified node under the unnamed node as the name of the unnamed node; and instructions for adding the MO instance in the management tree of the terminal device.

4. The communications device of claim 3, wherein the programs further comprises:

instructions for replacing the node value with preset characters when the node value is set as the name of the unnamed node and the node value contains special symbols.

* * * * *